(12) United States Patent
Berrett et al.

(10) Patent No.: US 9,191,692 B2
(45) Date of Patent: Nov. 17, 2015

(54) AGGREGATED TUNER SCHEDULING

(75) Inventors: Douglas Berrett, Seattle, WA (US);
Cory Cirrincione, Bellevue, WA (US);
Joseph McClanahan, Redmond, WA (US); Sean Kollenkark, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 720 days.

(21) Appl. No.: 12/791,940

(22) Filed: Jun. 2, 2010

(65) Prior Publication Data

US 2011/0302606 A1     Dec. 8, 2011

(51) Int. Cl.
| H04N 7/16 | (2011.01) |
| H04N 21/426 | (2011.01) |
| H04N 21/436 | (2011.01) |
| H04N 21/458 | (2011.01) |
| H04N 21/6543 | (2011.01) |

(52) U.S. Cl.
CPC ..... *H04N 21/4263* (2013.01); *H04N 21/43615* (2013.01); *H04N 21/4583* (2013.01); *H04N 21/6543* (2013.01)

(58) Field of Classification Search
CPC .................................................. H04N 21/4223
USPC ................. 725/21, 34; 342/417; 348/732
See application file for complete search history.

(56) References Cited

U.S. PATENT DOCUMENTS

| 5,450,135 | A  | * | 9/1995 | Schick ........................ | 348/732 |
| 6,307,842 | B1 | * | 10/2001 | Nakata et al. ................. | 370/254 |
| 7,003,791 | B2 | * | 2/2006 | Mizutani ........................ | 725/21 |
| 7,603,022 | B2 |   | 10/2009 | Putterman et al. | |
| 7,669,222 | B2 |   | 2/2010 | McEnroe | |
| 7,779,446 | B2 |   | 8/2010 | Westbrook et al. | |
| 7,849,486 | B2 |   | 12/2010 | Russ et al. | |
| 8,116,611 | B2 |   | 2/2012 | Bumgardner et al. | |

(Continued)

FOREIGN PATENT DOCUMENTS

| CN | 201044475 A | 4/2008 |
| CN | 101394538 A | 3/2009 |

(Continued)

OTHER PUBLICATIONS

Windows XP Media Center Edition 2005: Frequently Asked Questions—Published Date: Jan. 19, 2006 http://www.wardconciliation.com/MediaCenterFAQ.PDF.

(Continued)

*Primary Examiner* — Hunter B Lonsberry
*Assistant Examiner* — Tariq Bond
(74) *Attorney, Agent, or Firm* — Judy Yee; Aaron Chatterjee; Micky Minhas

(57) ABSTRACT

A television recording system in which multiple client devices can form a group, sharing tuners and channel lineups. The clients may be desktop or laptop computers, digital video recorders or other set top boxes. A device within the group may act as a master, maintaining a master recording schedule and assigning tuners to record programs when scheduled or when a client requests use of a tuner for display live programming. Clients may register with the master, revealing the capabilities of their tuners. The master may, each time a tuner is desired, select an appropriate tuner based on multiple criteria, including bandwidth considerations and capabilities of the tuner.

16 Claims, 7 Drawing Sheets

(56) References Cited

U.S. PATENT DOCUMENTS

| | | |
|---|---|---|
| 8,199,053 B2 * | 6/2012 | Gribler .................. 342/417 |
| 8,225,354 B2 | 7/2012 | Acton et al. |
| 8,528,015 B2 | 9/2013 | Bumgardner et al. |
| 2001/0033343 A1 | 10/2001 | Yap |
| 2002/0046404 A1 | 4/2002 | Mizutani |
| 2003/0149988 A1 * | 8/2003 | Ellis et al. .................. 725/87 |
| 2004/0156614 A1 | 8/2004 | Bumgardner |
| 2005/0002640 A1 | 1/2005 | Putterman et al. |
| 2005/0102698 A1 * | 5/2005 | Bumgardner et al. ........ 725/80 |
| 2006/0031888 A1 | 2/2006 | Sparrell et al. |
| 2006/0035610 A1 * | 2/2006 | Potrebic .................. 455/178.1 |
| 2006/0268099 A1 | 11/2006 | Potrebic |
| 2007/0022032 A1 * | 1/2007 | Anderson et al. ............. 705/35 |
| 2007/0058924 A1 * | 3/2007 | Yeh .................. 386/46 |
| 2007/0079334 A1 | 4/2007 | Silver |
| 2007/0157281 A1 * | 7/2007 | Ellis et al. .................. 725/134 |
| 2008/0028208 A1 * | 1/2008 | Bolcer et al. .................. 713/156 |
| 2008/0127277 A1 | 5/2008 | Kuschak |
| 2008/0155636 A1 * | 6/2008 | Cruz et al. .................. 725/131 |
| 2008/0276271 A1 * | 11/2008 | Anderson et al. ............. 725/34 |
| 2008/0282312 A1 * | 11/2008 | Blinnikka .................. 725/153 |
| 2009/0007199 A1 * | 1/2009 | La Joie .................. 725/95 |
| 2009/0133069 A1 * | 5/2009 | Conness et al. .................. 725/46 |
| 2009/0178098 A1 | 7/2009 | Westbrook et al. |
| 2010/0030844 A1 * | 2/2010 | Miyama et al. .................. 709/203 |
| 2010/0077427 A1 * | 3/2010 | Helms et al. .................. 725/32 |
| 2010/0251297 A1 * | 9/2010 | Berkoff .................. 725/39 |
| 2010/0263011 A1 * | 10/2010 | McMurtrie .................. 725/110 |
| 2011/0050502 A1 * | 3/2011 | Gribler .................. 342/417 |
| 2011/0087490 A1 * | 4/2011 | Olson .................. 704/231 |

FOREIGN PATENT DOCUMENTS

| | | |
|---|---|---|
| JP | 2004023326 A | 1/2004 |
| JP | 2008510367 A | 4/2008 |
| JP | 2010035026 A | 2/2010 |
| TW | I318363 B | 12/2009 |
| TW | I318843 B | 12/2009 |

OTHER PUBLICATIONS

Building My Own Media Center, Part 1—Published Date: Feb. 7, 2005 http://www.networkworld.com/net.worker/columnists/2005/0207shaw.html.

Firewire Digital HD TV Tuner—Retrieved Date: Apr. 5, 2010 http://groupaware.com.au/index.php/vmchk/HDTV-Tuners/Firewire-Digital-HD-TV-Tuner/Detailed-product-flyer.html.

"First Office Action Issued in Japan Patent Application No. 2013-513248", Mailed Date: Jan. 23, 2015, 6 Pages.

"Office Action and Search Report Issued in Taiwan Patent Application No. 100115374", Mailed Date: Feb. 3, 2015, 6 Pages.

"First Office Action and Search Report Issued in Chinese Patent Application No. 201180027065.X", Mailed Date: Jan. 23, 2015, 11 Pages.

"Office Action Received in European Patent Application No. 11790235.3", Mailed Dated: Sep. 27, 2013, 5 Pages.

"International Search Report and Written Opinion", Mailed Dec. 27, 2011, Application No. PCT/US2011/038258, Filed Date May 26, 2011, pp. 1-8.

* cited by examiner

AGGREGATED TUNER SCHEDULING

BACKGROUND

Television programs are frequently recorded in devices called digital video recorders (DVRs) or personal video recorders (PVRs) attached to television sets. It is also known that general purpose computers can be adapted to act as a DVR or PVR by installing one or more tuners in the computer. Software loaded on the computer provides a user interface through which a user may select programs on television to watch or record. In some instances, computers may be networked together such that content recorded by a tuner on one computer can be viewed on another computer.

Regardless of how the content is recorded and viewed, such systems employ various kinds of information to present programming options to a user and to identify and record television programming specified by the user. An electronic program guide (EPG) indicates programs from various content sources from which television programs are available and time slots in which the programs are available. A channel lineup indicates the sources of content available and the channels to which a tuner may be tuned to access each source of content.

The channel lineup may depend on the location or type of television service to which the tuner is connected. For example, many cable television service providers offer to their subscribers programs from many major networks. However, the channel used for content from each network may be different for different cable service providers. Similarly, a satellite service provider may use different channels than a cable service provider for television programming from the same content sources. Further, some service providers may provide local programming that may be different in different locations.

Also, a channel lineup available to a tuner may depend on a service level purchased by a user operating a tuner. A tuner connected to a cable for which a basic service subscription has been purchased may have a more limited channel lineup than a tuner connected to a cable for which an expanded service subscription has been purchased. Likewise, some channels are designated as "premium" channels and are only accessible when premium subscription fees are paid.

A tuner may be able to determine its channel lineup by scanning for signals it can detect. The signals themselves may contain identification of their content source. Though, content sources may be associated with available channels, or the entire channel lineup may be obtained, using externally supplied information, such information input by a user or obtained over the Internet.

In operation, a computerized device, such as a set-top box or a personal computer with an application that supports recording and display of television content, may present the electronic programming guide to a user, generally through a graphical user interface. The user may then select programs listed in the EPG to record. The recording device may use information from the EPG to determine a content source from which to obtain content and time slot during which to schedule that recording. The recording device may apply the channel lineup to determine the channel to which to tune a tuner during the recording time slot.

SUMMARY

A user experience in viewing television programming may be enhanced by aggregating television recording information among multiple computerized devices that can interact over a network. The likelihood that a desired program or even multiple concurrent programs can be recorded is increased.

In operation, the multiple computerized devices may organize themselves into a group with one of the devices designated as a master. The computerized devices may register with the master, providing to the master information about the tuners they contain and the channel lineups that they support. The master may aggregate this information in a master lineup, indicating all of the content sources available within the group. As devices receive from their users requests involving access to television programming, these requests may be communicated to the master, which may select a tuner from the group to obtain television programming that responds to the request and record it or deliver it live to the user.

To support group operation, the master may maintain aggregated television information, including a master lineup and a master recording schedule. Based on the master recording schedule, at a scheduled time for recording a program or in response to a request for live television programming, the master may select an appropriate tuner. Criteria used in selecting a tuner may improve the quality and availability of television programming. These criteria may include the type of programming to be accessed, type of tuners available in the group and bandwidth of network connections for devices containing the tuners.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
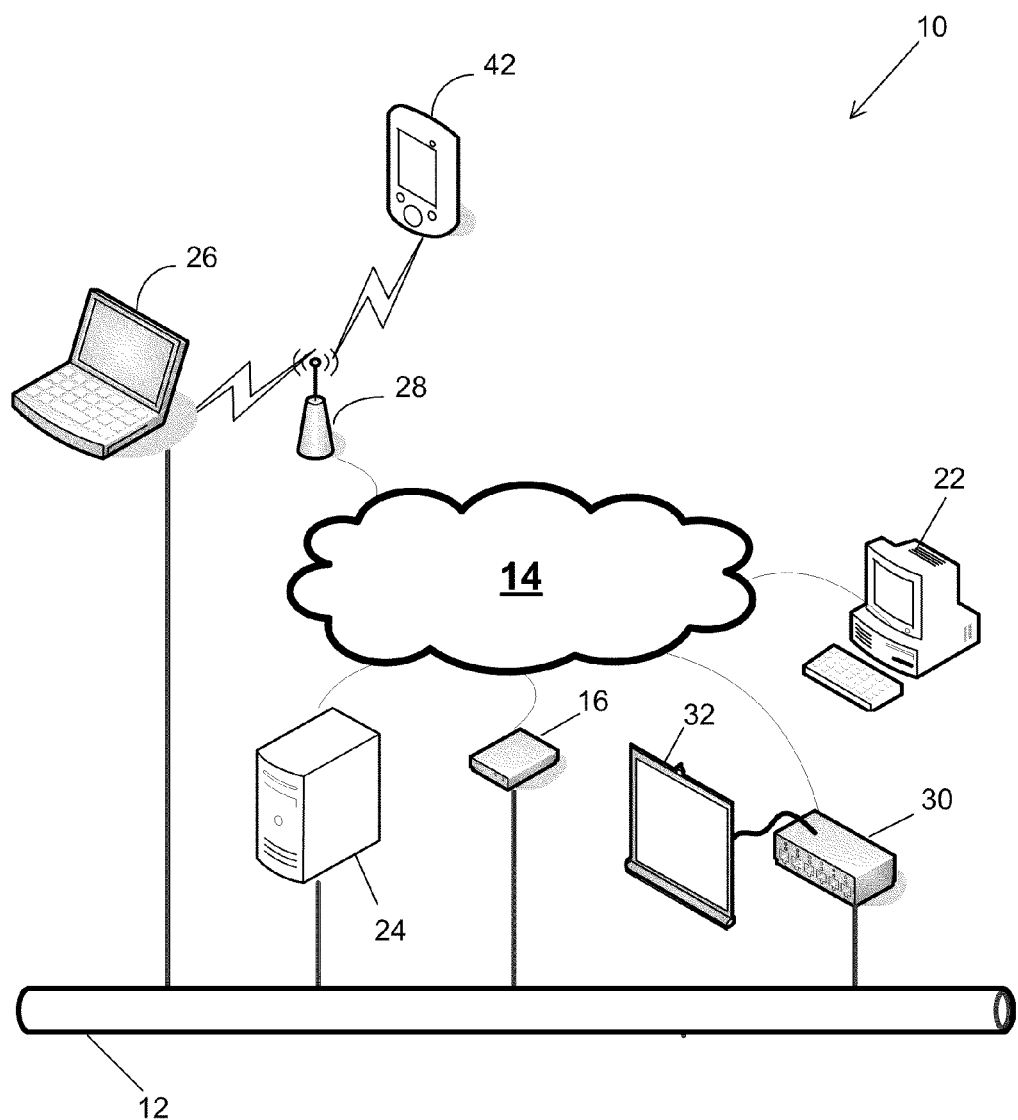
FIG. 1 is a sketch of an exemplary environment in which embodiment of the inventions may operate.

The inventors have recognized and appreciated that an experience of users of home entertainment devices may be improved by equipping a group of devices joined through a network with a service that allows the devices to share television information. By sharing this information, the likelihood that a user will be able to watch a desired program, either live or based on a recording, may be increased. Yet, the burden on the user for operating the devices is comparable to that of operating a single device with recording capability.

The shared television information may relate to television programming accessible by each of the devices in the group. This information may include identification of tuners in the devices and the channel lineup for each tuner. The shared information may be aggregated to indicate total capabilities of the group to access television programming, whether for live display to one or more users or for recording for later presentation to users.

The shared information may include information about all of the tuners, which may be stored as a tuner pool. Aggregated information about sources of content that can be accessed through the tuners in the group may be maintained, such as in the form of a master channel lineup. A master recording schedule also may be created, reflecting the aggregate of requests to record programs from users of all devices in the group. As a program is to be recorded, as indicated in the master recording schedule, or a request from a user to access live television programming is received, a tuner may be selected using the master channel lineup. A command may then be sent to a device incorporating that tuner to control the tuner to record the indicated program or provide live television programming.

The shared information may be collected in a device acting as a master. The master may be a device that is part of the group and may itself contain a tuner that can access television programming. Though, there is no requirement that the master include a tuner, provide a user interface or even be on the same local network as other devices in the group. The master could be any device capable of communication with the other devices in the group. As an example, the master may be accessible over the Internet such that the master lineup could be regarded as being "in the cloud."

As new devices are configured to access television programming, these devices may interact with the master as clients by searching for and registering with the master. The clients may share with the master information about the tuners they contain and the channel lineup that each tuner can access. Additionally, as a user interacting with a device acting as a client inputs a request that requires a tuner to obtain television programming, the client may send a request to the master.

In response to such requests for later recording of television programming, the master may make an entry in a master recording schedule. At times when a tuner is required, either because of entry in the master recording schedule or a request for live television content, the master may select and send a command assigning a tuner to obtain the required television programming. The selected tuner may obtain the requested television programming and the device containing the tuner may display it for a user of that device, send it to another device or record it and store it in a library for later presentation.

The computerized devices that form a group may be of any suitable type or types. These devices may be interconnected in any suitable way. Though, in some embodiments, the devices that form a group may be interconnected over a home network and may be computerized devices of the type that conventionally may be used within a home. The devices, for example, may include personal computers, such as desk top computers and laptop computers, or set-top boxes, such as digital video recorders. Alternatively, such devices may be located "in the cloud." Though, the specific devices used and the manner in which they are interconnected is not critical to the invention.

FIG. 1 illustrates an exemplary embodiment of a system 10 in which television information may be aggregated. The system 10 includes interfaces to one or more media over which television programming may be obtained. In the example of FIG. 1, that media is illustrated by cable 12. Cable 12 may be a cable as is known in the art connecting a home, office or other facility to a service provider. Cable 12 may carry electrical signals from a service provider to a premises containing system 10. Alternatively, cable 12 may be a fiber optic cable, carrying signals representing television programming in optical form. Though, it should be recognized that the nature of the signals carried on cable 12 is not critical to the invention.

Moreover, the specific media used to access television programming is not critical to the invention. It is known, for example, to access television programming from satellite or other wireless communications. System 10 may include tuners that may access television programming over one or more types of media.

Regardless of the specific media used to access television programming, the signals representing television programming for each media may be generated by a television service provider. The television service provider may provide multiple channels of television programming, all of which may be communicated over the media. As a specific example, cable 12 may carry electrical signals representing hundreds of channels of television programming. A satellite link may provide a connection to a television service provider that similarly provides access to multiple channels of television programming.

Regardless of the specific sources of television programming to which system 10 is coupled, one or more of the computerized devices within computer 10 may be configured to access television programming over a medium used by a service provider to which system 10 is coupled. Computerized device may be adapted to access television programming by including a hardware component, called a "tuner." The tuner may be coupled to the media—cable 12 in the example of FIG. 1—and receive signals carrying television programming from that media. The tuner may be controlled, such as by commands sent from a processor in the computerized device, to select a specific channel on the media. The signals carrying television programming on that channel may then be decoded by the tuner and presented in a format that may be manipulated by a computerized device. Such tuners are known in the art, and any suitable tuner or tuners may be used in system 10.

In the embodiment of FIG. 1, multiple computerized devices connected to cable 12 are illustrated. As one example, digital video recorder 30 is shown coupled to cable 12. Digital video recorder may be programmed such that a tuner within digital video recorder accesses signals in specific channels carried on cable 12 at programmed times. The tuner within digital video recorder 30 may decode the signals on those channels and output them in digital form. A processor within digital video recorder 30 may manipulate that data by storing it on a disk or other storage media and presenting it on a television 32 in response to a user input at a later time.

Digital video recorder 30 is an example of a computerized device sometimes called a set top box because of a conventional association between such a computerized device and a television set through which content captured by the device is displayed to a user. Though, it is not a requirement that a tuner be within a computerized device dedicated for use in recording television programming. Tuners may be contained in other types of computerized devices, including general purpose computers such as desk top computers and lap top computers. In the example of FIG. 1, a general purpose computer 24 is illustrated coupled to cable 12. General purpose computer 24 may include a tuner that similarly can be controlled to select signals on a channel on cable 12 and provide them to a processor for manipulation in digital form.

Lap top computer 26 may also be configured with a tuner to access television programming carried on cable 12.

In system 10, the computerized devices that can access television programming over cable 12 are also interconnected via network 14. Network 14 may be a computer network as is known in the art. In the example in which system 10 is deployed within a user's home or other premises, network 14 may be a home network or other suitable type of local area network (LAN). However, the specific type of network 14 is not critical to the invention, and any suitable network may be used to allow communication among computerized devices of system 10.

In the example of FIG. 1, a connection is provided between cable 12 and network 14 through internet gateway device 16. Such a device may be used when cable 12 conveys information in addition to television programming. Some television service providers also provide high speed internet access using the same media used to convey signals carrying television programming. In such a scenario, the connection between network 14 and cable 12 allows computerized devices coupled to network 14 to access that high speed internet service over cable 12. Though, it is not a requirement that system 10 provide Internet service over the same media used to provide television service. It is also not a requirement that system 10 include Internet service. However an internet connection is an example of another media over which a device could access television programming.

In some scenarios, television programming may be accessible over the Internet. Accordingly, one or more of the computerized devices coupled to network 14 may also access television programming available over the Internet. As a specific example, computer 22 is shown coupled to network 14, but not directly to cable 12. Though computer 22 may not include a cable tuner capable of decoding signals representing television programming communicated on cable 12, computer 22 may nonetheless include components serving as a "tuner" for accessing television programming available over the Internet. In that scenario, computer 22 may have a channel lineup differing from the channel lineups accessible to digital video recorder 30 or other computerized devices with tuners coupled to cable 12. Specifically, the channel lineup for computer 22 may reflect programming available through the Internet rather than television programming provided by a television service provider managing a network to which cable 12 is connected.

FIG. 1 illustrates that computerized devices may be connected together in any suitable way, including using wired or wireless connections. The example of FIG. 1 shows that digital video recorder 30 and computer 24 are wired to cable 12 and to network 14. Though, network 14 may include a wireless access point 28 or other mechanism to support wireless connections. In the example of FIG. 1, computer 26 may access network 14 through wireless access point 28. Thus, the invention is not limited to any specific type of connection to network 14. Though, as described in more detail below, the nature of the connections to network 14 may be a factor in selecting a tuner through which to obtain television programming.

The permanence of a connection between a computerized device and network 14 may also be a factor in selecting a tuner. FIG. 1 illustrates that different types of connections may be made to cable 12. In the example of FIG. 1, computer 26 is a portable device, which may sometimes be connected to network 14 and sometimes removed from system 10. Therefore, the computer storage media within computer 26 may be accessible to other computerized devices over network 14 at sometimes, but not at others.

FIG. 1 also indicates that computerized devices may be connected to network 14 to access television programming even though the devices do not have a tuner. As an illustration of this scenario, system 10 includes portable electronic device 42. Device 42 is coupled to network 14 through wireless access point 28. Using network communication techniques as are known in the art, device 42 may access digital data containing television programming stored on any of the computerized devices that are also coupled to network 14. Alternatively or additionally, device 42 may access digital data over network 14 from another device as that data is being generated, allowing a user of device 42 to view television programming live.

Communication protocols that allow a computerized device to access television programming that exists as digital data on another computerized device are known in the art. For example, a computerized device may store recorded television programming in a library or other file storage system, which may then be accessed by another computerized device over network 14, or any other network. For example, in a cloud application, the file storage may be accessed over the Internet. Any suitable technique may be used to allow a device, such as device 42, to access data representing television programming.

To enhance the availability of television programming to any of the computerized devices illustrated in FIG. 1, the devices may share television information in addition to simply sharing recorded television programming. Sharing of information may allow requests for television programming input by a user into one of the computerized devices of system 10 to be fulfilled by a tuner in another of the computerized devices. Such an approach may allow, for example, a user of a computerized device to specify more television programs to be concurrently recorded than the computerized device has tuners. Additionally, sharing of television information may allow a user of a device to access live television programming while concurrently recording one or more other programs. To support such capability, one or more of the computerized devices in system 10 may include components that allow the devices to dynamically form a group sharing television information.

Figure 2:
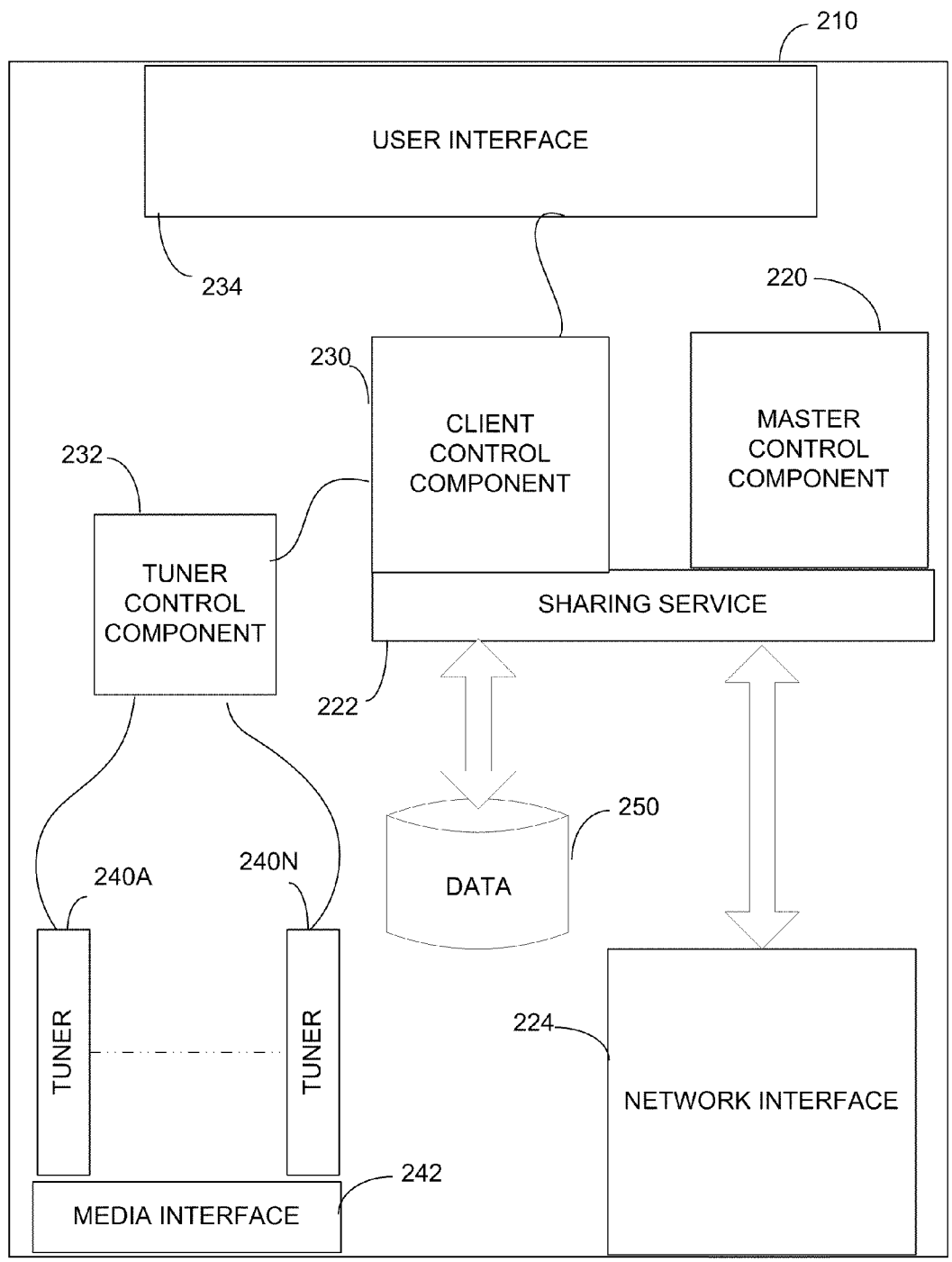
FIG. 2 is an architectural block diagram of a representative computerized device in the system of FIG. 1.

FIG. 2 illustrates aspects of an architecture of a computerized device 210 that may be adapted to participate in a group of devices formed to share television information. In the example of FIG. 2, device 210 has an architecture that may be representative of multiple devices within system 10, including computers 22, 24 and 26 and digital video recorder 30. Though, it should be appreciated that different computerized devices may have different architectures. Additional aspects of representative components that may alternatively or additionally be included in a computerized device participating in a group sharing television information are illustrated in connection with FIG. 7, below.

In the embodiment illustrated in FIG. 2, a group of computerized devices is formed with a device in the group being designated as the master device. In the embodiment illustrated in FIG. 2, the device that operates as the master may be dynamically selected from among any of the devices in the group. Accordingly, each device may contain components that allow the device to act as a group master. Accordingly, the architecture of FIG. 2 includes master control component 220.

Master control component 220 may be implemented as an application program or portion of an application program.

Master control component 220 may perform functions associated with aggregating television information from multiple devices in a group. The aggregated information may relate to capabilities of the devices for accessing specific television programming as well as the aggregated requests for television programming from users of the devices in the group.

Master control component 220 may also be configured to aggregate information relating to requests for television programming from one or more devices within the group. These requests may be for live television programming or to record television programming for later presentation to a user. Based on these aggregated requests, the master control component may determine when a tuner is required to obtain television programming and then select an appropriate tuner in one or more of the devices in the group to obtain that television programming.

Devices in a group that are not acting as a master may be configured as clients that interact with the master. FIG. 2 illustrates an embodiment in which device 210 may be configured to act as either a master or as a client within the group. Accordingly, FIG. 2 illustrates device 210 with a client control component 230. Client control component may interact with a master control component 220 operating in a device designated as a master, which may be a different device. Though, in some embodiments, a client control component 230 may interact with a master control component 220 in the same device such that the device designated as the master may also perform functions of a client.

The client control component 230 may share with the master control component 220 information relating to the capabilities of the client to record television programming. Additionally, the client control component 230 may receive inputs generated by a user indicating requests for television programming and return information to a user, such as through user interface 234, which may be a component that renders a graphical user interface on a display or other input/output device that is part of or connected to device 210. User requests may relate to television programming to be presented live to the user of device 210 or to be recorded at a later time, for access by that user or another user, possibly through a different device.

In response to such requests for television information, client control component 230 may forward the request to a master control component 220 executing within a device designated as the master. To facilitate communications among devices in the group, each device may contain a sharing service 222. Sharing service 222 may be implemented using programming techniques as are known in the art to implement network based services. The specific implementation of sharing service 222 is not critical to the invention. Likewise, the specific protocol used for exchanging communications among devices forming a group is not critical to the invention. However, in some embodiments, sharing service 222 may be configured to allow devices to send commands or information to other devices over a network, such as network 14 (FIG. 1). Accordingly, FIG. 2 shows that device 210 includes a network interface 224. Network interface 224 may allow device 210 to communicate over any suitable network. In the example of FIG. 1, network interface 224 may be configured to allow device 210 to communicate over a local area network such as network 14 with other devices forming a group.

In some embodiments, commands and information shared among devices in the group may relate to capabilities to acquire television programming. One of those capabilities relates to tuners installed in each device. In the example of FIG. 2, device 210 is shown to contain tuners, of which tuners 240A . . . 240N are illustrated. Each of the tuners is coupled to a video input 242. In embodiments in which television programming is obtained over a cable 12, media interface 242 may be a connection to cable 12. In that scenario, each of tuners 240A . . . 240N may be able to select a specific channel from cable 12 and capture digital information representing television programming on that channel. Though, it should be recognized that FIG. 2 is a schematic illustration and that a tuner need not be physically inside a device to be regarded as installed in the device. A tuner may be regarded as installed in a device if that tuner can be controlled from the device, whether over dedicated wiring or other form of connection.

Though, as described above in connection with FIG. 1, the media over which television programming is obtained is not critical to the invention and there may be more than one media from which devices can obtain television programming. Accordingly, media interface 242 may make a connection to any suitable media from which television programming can be obtained, including a satellite link or even the internet. In embodiments in which television programming is obtained over the internet, media interface 242 may be the same as network interface 224. Moreover, FIG. 2 shows a single media interface for simplicity. A device may be connected to more than one media and may have more than one media interface.

Regardless of the media to which device 210 is connected, one or more tuners 240A . . . 240N may be available to select a channel on a media from which to obtain television programming. The specific construction of the tuners 240A . . . 240N may be based on known design techniques, but may depend on the nature of the media to which media input 242 is connected. The tuners, for example, may be cable television tuners, satellite tuners or, in scenarios in which the media input is the internet, may be components adapted to acquire digital content from websites on the Internet.

Regardless of the nature of tuners 240A . . . 240N, the tuners may be controllable to select a channel on a media to which they are coupled to obtain television programming that is on that channel. In the embodiment illustrated in FIG. 2, each of the tuners 240A . . . 240N may be controlled by a tuner control component 232. Tuner control component 232 may control the tuners based on commands issued by client control component 230 or other control component. Though, actions of tuner control component 232 may be derived in other suitable ways, such as from a locally stored recording schedule that indicates times and channels from which television programming is to be recorded. Tuner control component 232 may track the times at which recording is desired and control tuners 240A . . . 240N to record television programming as specified in the local recording schedule.

Regardless of the source of control information, when tuner control component 232 controls one or more tuners to recorded television programming, the recorded television programming may be stored as digital data in data store 250. From data store 250, a user interface component 234 may present the digital data to a user through a display or other suitable interface device. Alternatively or additionally, the digital data in data store 250 may be made accessible to other devices, such that programming recorded at one device may be accessed at another device for display or storage on devices other than those at which the programming was recorded.

In the embodiment illustrated, data store 250 is illustrated as being within device 210. It should be appreciated FIG. 2 is an example of only one possible embodiment. Data store 250 need not be inside device 210. Data store 250 may be at any location accessible to device 250, including "in the cloud" such that it is accessed over the Internet or other suitable network.

Figure 3:
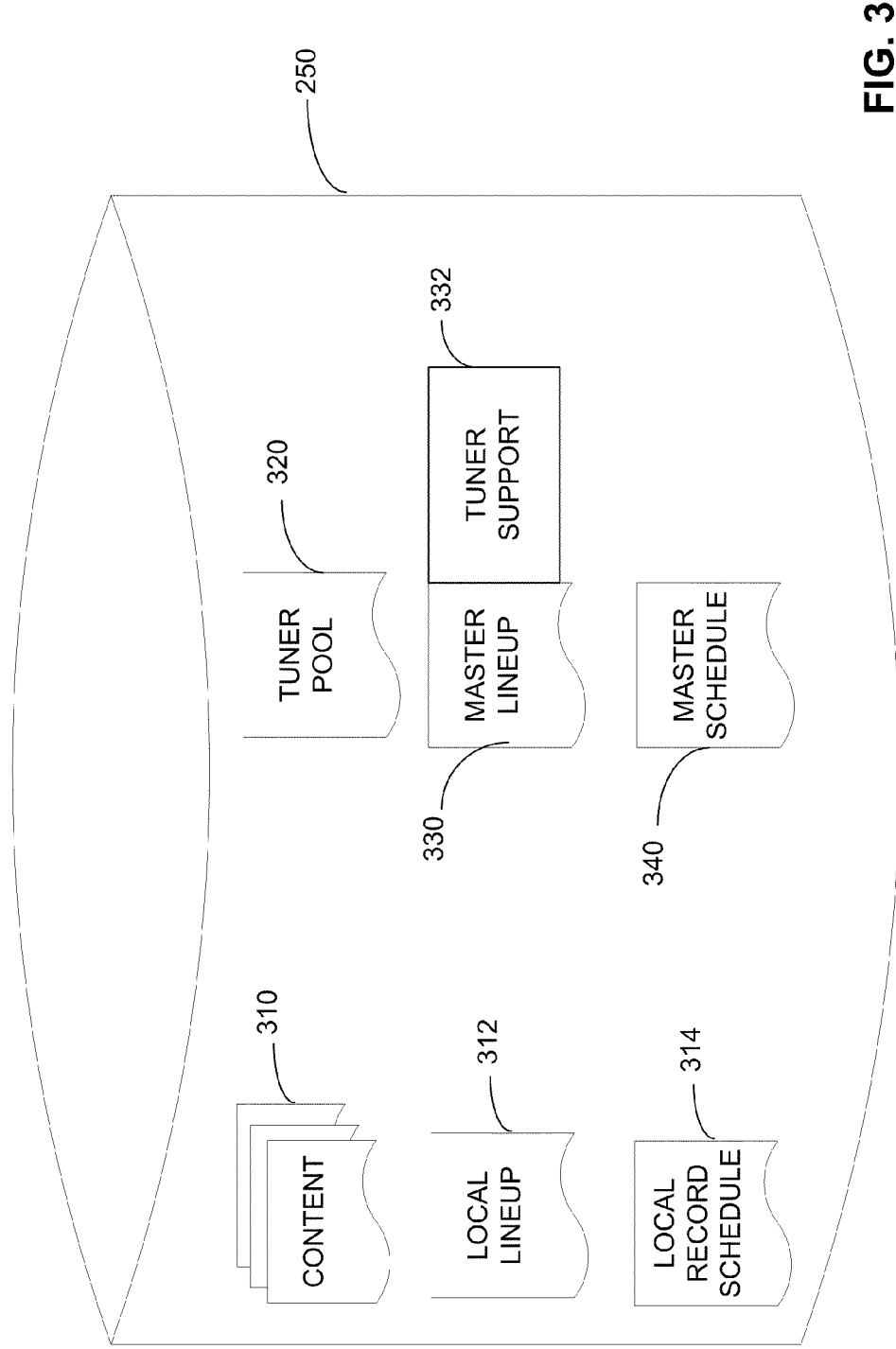
FIG. 3 is a schematic illustration of a data store maintained by the computerized device of FIG. 2.

In addition to storing recorded television programming, data store 250 may store local television information relating to the capabilities and operation of client 210. FIG. 3 schematically illustrates an embodiment of data store 250, which may be implemented in any suitable computer storage medium to which device 210 has access.

In this example, data store 250 includes content 310, representing recorded television programming. In addition, data store 250 may contain one or more lineups accessible over media to which device 210 is connected. Additionally, a local recording schedule 314, as accessed by tuner control component 232, may be stored. This local information may be generated and stored using techniques as are known in the art for operating digital video recording devices, though any suitable techniques may be used to generate it.

Additionally, data store 250 may store aggregated information. The aggregated information may be stored in scenarios when device 210 is operating as a master of a group of devices. Though, in some embodiments, copies of master information may distributed across all or a subset of the devices in a group, even to devices operating as clients. Distribution provides redundancy such that master information is not lost if a device acting as a master is turned off or otherwise disconnected from the group. Also, some of the aggregated information, such as a master lineup, may be used by a device operating as a client. Any suitable techniques may be used to synchronize aggregated information used by a device acting as a client and the data maintained by a device acting as a master. The client, for example, may request updated information from the master before using it. Or, the master may provide updates to such information to the client whenever the aggregated information changes.

In the example of FIG. 3, the aggregated information includes tuner pool 320. Tuner pool 320 contains information defining tuners available in a group containing device 210. The information stored in tuner pool 320 related to each tuner may define characteristics of the tuner, such as the type of media to which it is connected, an indication of the permanence of the tuner, whether it has capabilities to support digital rights management and a nature of the connection between a device containing the tuner and network 14. As an example of the tuner type, information in tuner pool 320 may indicate whether the tuner is an analog or digital tuner. As to the type of tuner, information in tuner pool 320 may indicate whether it is a terrestrial, cable, satellite or IP (Internet) tuner. Information about the computerized device in which the tuner is installed may be recorded as an identifier of where the tuner resides. Information about permanence of the tuner may reflect whether the tuner is intended to be removed from the system from time-to-time. A tuner installed in a laptop computer, for example, may be deemed to have a low permanence because the laptop computer, itself, may be removed from the system from time-to-time. Likewise, a tuner plugged into an external USB port on a computer may also be deemed to have a low permanence. In contrast, a tuner on a card inside a desktop computer for set top box may be viewed as a relatively permanent tuner. Information about whether the tuner supports digital rights management may be recorded in any suitable way, such as a flag indicating whether the tuner supports digital rights management or one or more codes indicating the nature of digital rights management supported by the tuner. Also, information on client connectivity may indicate whether the client in which the tuner is installed is connected to network 14 through a wired connection, a wireless connection or other suitable type of connection. Such information may be used in determining which tuners are appropriate for fulfilling a request for television programming and for selecting a tuner that will increase the likelihood that, in the aggregate, all user requests can be met so as to improve the experience of the users.

Information in tuner pool 320 may be stored by a master control component 220 in a device designated as the master based on communications from client control components 230 in computerized devices in the group. As clients register with a device operating as a master, the master control component 220 in the master device may store information about the tuners in the devices registering.

Data store 250 may also store a master lineup 330, which likewise may be created by master control component 220 (FIG. 2) based on information about the channel lineup that each tuner can access that is sent to the master as each client registers. That information may be formatted as master lineup 330, representing the aggregate of all channels accessible through at least one tuner of any device in a group. Tuner support information 332 may be stored in conjunction with master lineup 330. Tuner support information 332 may indicate for each source of television programming listed in master lineup 330, the tuner or tuners through which that source of television programming may be accessed.

In addition, data store 250 may contain master schedule 340. Master schedule 340 may also be constructed by master control component 220 in a device acting as a master for a group of other devices based on communications from the client control components 230 in the devices of the group. Master schedule 340 may capture recording requests issued by users of each of the devices in the group. The schedule may identify recording requests in any suitable way that can be used to select and control one or more of the tuners within the system at an identifiable recording time.

The information in master schedule 340, for example, could be formatted as a list of television programs to be recorded. Master control component 220 might then map each television program to a channel using an electronic program guide. Based on the source of content identified for the program through the use of the electronic program guide, master control component 220 may consult a master lineup 330 to identify a channel carrying television programming from that content source. Tuner support information 332 may be used in conjunction with that master lineup 330 to select a tuner capable of being tuned to the designated channel. Based on information in tuner pool 320, master control component 220 may identify a computerized device containing the selected tuner and send appropriate control messages to that tuner.

Though, it should be appreciated that some or all of the steps used to select a tuner within the group to record a designated program may be determined at the time an entry is made in master schedule 340 to represent television programming to be recorded. As a specific example, master schedule 340 may contain identification of programming information to be recorded by channel and time. Such information may be generated by consulting an electronic program guide at the time a recording request is written into master schedule 340, rather than at the time a tuner is controlled to record that program.

Figure 4:
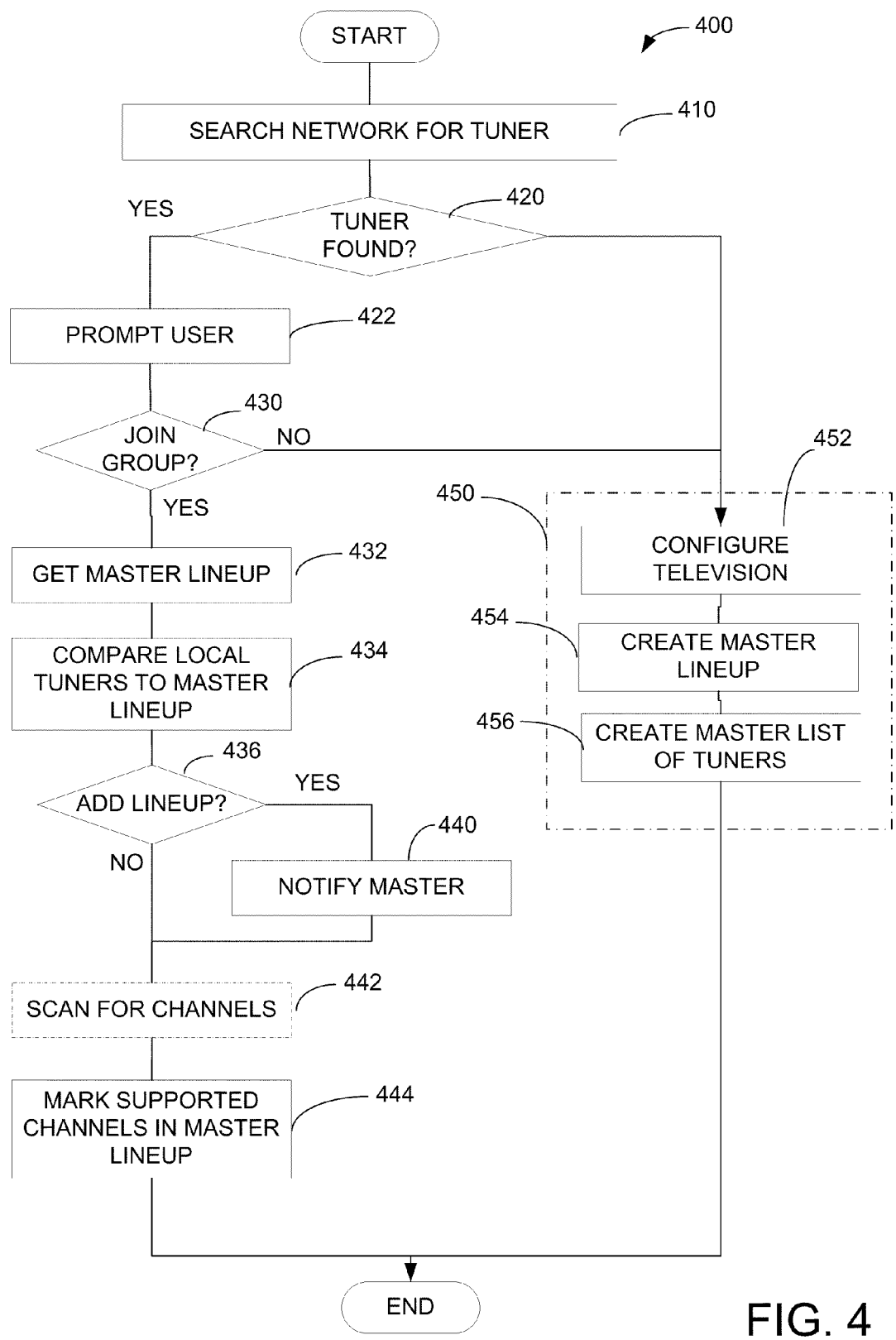
FIG. 4 is a flow chart of a process of setting up a computerized device for operation within the computer environment illustrated in FIG. 1.

Turning to FIG. 4, an example is provided of a method of operating a computerized device forming a group in which television information is aggregated. Process 400 illustrated in FIG. 4 may be performed in a device, such as device 210 (FIG. 2) that may operate either in a master mode or a client mode. Accordingly, the process of FIG. 4 may be performed by each device that is capable of participating in a group that shares television recording information and includes acts relating to forming the group and designating a device in the group as a master.

Process 400 may be performed by each device as it is powered on. Though, the process of FIG. 4 may be triggered by any other suitable event effecting a computerized device, such as a user launching an application program through which a user may program recording of television programming. Such applications are known in the art for controlling a tuner on a device executing the application program. However, in the embodiment illustrated, the application may be modified as described herein to support aggregation of television recording information.

Regardless of the specific event that triggers the start of process 400 in a device, the process may begin at block 410 where the device searches a network, such as network 14 (FIG. 1) to which the device is connected for another device configured to share tuners. Processing in block 410 may be performed by a client control component 230 (FIG. 2) in the device executing the process of FIG. 4. The search for a tuner may be performed by sending service discovery messages or messages in any other suitable format over network 14.

At decision block 410, the process may branch depending on whether another tuner is found on the network. A device searching for a network tuner may determine that another device containing a tuner is on the network if the device searching for a network receives a response from another device indicating that the responding device has been configured as a master device within a group. Accordingly, such a response may be generated by a master control component 220 in a responding device that has been configured as a master for an existing group. If the searching device does not receive such a response, the process of FIG. 4 may branch to sub-process 450. In sub-process 450, the searching device may configure itself as the master.

Conversely, if the searching device receives a response indicating that another device has been configured as a master to aggregate television recording information, the process may branch from decision block 420 to block 422. At block 422, user input may be obtained on whether a user of the device executing the process 400 wishes to join in the group, sharing tuners with the device identified in block 410 and possibly other devices that are joined in a group with that device. This input may be obtained in any suitable way. For example, a dialogue box may be displayed on a graphical user interface of the computing device. The information displayed through the graphical user interface may alert the user to the possibility of joining a group. In scenarios in which multiple groups are identified, the information displayed at block 422 may identify choices for joining one or more groups. Though, user input may be obtained based on user preferences stored in a profile or in any other suitable way.

Regardless of the way in which user input is obtained at block 422, the process may proceed to decision block 430. At decision block 430, the process may branch based on whether the user has indicated a desire to join a group, sharing television information with other computerized devices on a local area network or other suitable network domain to which the computerized device executing process 400 is connected.

In the embodiment illustrated in FIG. 4, the process branches from decision block 430 to sub-process 450 when a user indicates that the user does not desire to join a group sharing television tuners with an identified device. When process 400 arrives at sub-process 450, whether because there is no existing group or the user does not wish to join an existing group, the computerized device executing process 400 may establish itself as a master capable of aggregating television recording information from other devices that may join with it. Within sub-process 450, the device may at block 452 configure itself for accessing television information. The processing within block 452 may be based on techniques known in the art and are currently used in devices that configure themselves for displaying or recording television signals. These steps may include choosing a proper head end for a cable service provider supplying cable television service over cable 12 or taking other steps as appropriate based on the media through which the device is coupled to a television service provider. Other acts at block 452 may include configuring one or more tuners installed in the device.

At block 454, the device may create a lineup based on tuners installed in the device and the television service providers to which those tuners are coupled. Processing at block 454 may also be as known in the art in a conventional computerized device designed to process television signals. That processing may involve scanning for available channels. Though, in this scenario, the aggregate of all of the lineups detected at block 454 may be treated as a master lineup and stored in data store 250 as master lineup 330 instead of or in addition to being stored as local lineup 312.

Processing may proceed to block 456 where a list of tuners installed in the device is created. This list of tuners may be stored in tuner pool 320 in data store 250. The tuners in the list created at block 456 may likewise be identified using known techniques.

In this case, though the lineup and tuner list created at blocks 454 and 456 are created using known techniques, they are termed a master lineup and master list of tuners, respectively, because they will serve the basis for the tuner pool and master lineup as client devices register with the master device and provide additional lineup or tuner information.

Once the device is configured as a master in accordance with sub-process 450, process 400 may end. When the process ends following execution of sub-process 450, the device is left configured as a master. The device may, if it has a user interface, receive commands from a user, requesting that television programming be recorded and/or television programming be displayed live for the user. In response to such user input, the device may interact with the user as a conventional, stand-alone device equipped for displaying or recording television programming. Though, master lineup 330 may be used to identify a tuner to obtain television programming. Likewise, commands to record television programming may be stored in master schedule 340.

Figure 5:
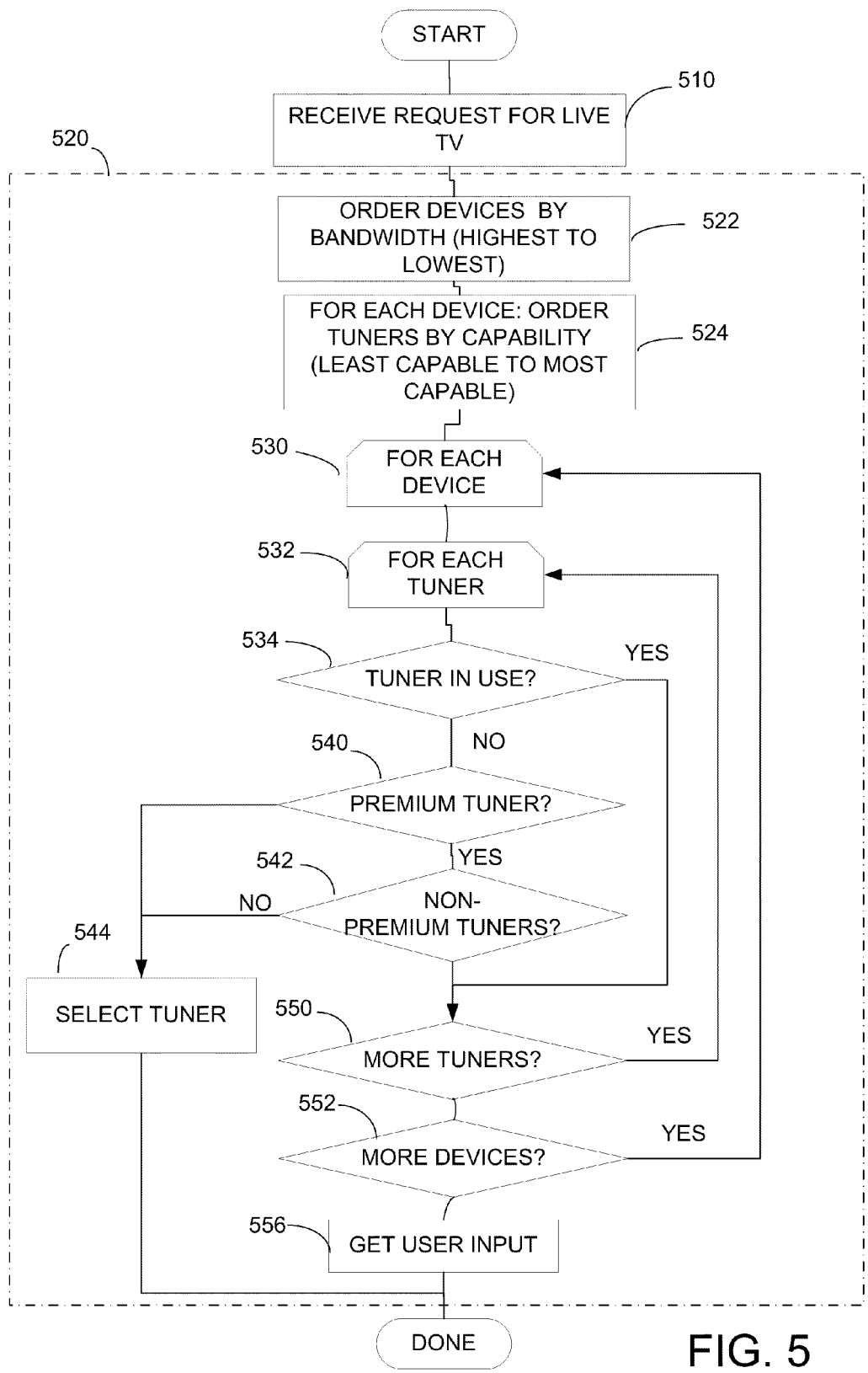
FIG. 5 is a flow chart of a process of selecting a tuner to access television programming live that may be performed by a computerized device operating as a master within the environment of FIG. 1.

Once other devices connect to the master device as clients in a group, the device configured as a master may employ a process, an example of which is illustrated in FIG. 5 and described below, of selecting a tuner from among multiple available tuners for obtaining live television information. Similarly, the device may receive a request from another device configured as a client in the group for recording of television programming, in which case, the device configured as a master may respond in accordance with the process of FIG. 6 as described below.

Conversely, if the user indicates at block 422 the desire to form a group with one or more detected devices having tuners, the process may branch at decision block 430 to begin processing steps that configure the device as a client in an existing group.

At block 432, the device may obtain a master lineup from a device designated as a master for the existing group. Any suitable protocol may be used obtain the master lineup. However, when process 400 is performed by a device configured as in FIG. 2, processing at block 432 may entail client control component 230 of that device sending a message to the device configured as a master. Such a message may be configured to pass through a sharing service 222 on the device configured as the master for processing by the master control component 220. In response, master control component 220 may send one or more messages through the sharing service 222 of the device configured at the client.

The messages exchanged between the client and the master may represent the information in master lineup 330 (FIG. 3) maintained by the master device. The master lineup 330 may be identified in any suitable form, including as a text file or a structured file, such as an XML file. Alternatively, the information conveyed may be a pointer, URL or other identifier of a location from which data representing the master lineup may be obtained.

Once the master lineup is obtained at block 432, the device executing process 400 will compare the master lineup to one or more lineups supported by tuners installed locally in the device to determine whether the local tuners can access channels not reflected in the master lineup. The lineups supported by local tuners may be determined in any suitable way, including based on user input or by scanning for television signals on or more media to which the device is connected.

Regardless of the manner in which lineups supported by local tuners are determined, the process may branch at decision block 436 depending on whether the local tuners are capable of tuning to channels not indicated in the master lineup. If so, the process may branch to block 440. At block 440, the master may be notified of the additional channels supported by local tuners in the device executing process 400. These notifications may also be formatted in any suitable way, and may identify additional supported lineups or may identify additional channels supported locally.

Regardless of the manner in which this information is conveyed, notifications containing the information may be sent through a sharing service 222 (FIG. 2) on the device configured as a master. Though, any suitable communication mechanism may be used. Upon receipt of such notifications, a master control component 220 (FIG. 2) in a device configured to act as master may update the master lineup 330, reflecting the additional capability for the tuners in the device configuring itself as a client in accordance with process 400.

The process may proceed to block 442. Processing may also reach block 442 directly if the device configuring itself as a client in accordance with process 400 did not identify an additional channel lineup that was not already reflected in the master lineup obtained at block 432. Regardless of the manner in which processing reaches block 442, at block 442, the device may scan media to which it is connected for channels that can be accessed by tuners installed in the device.

FIG. 4 illustrates that scanning for channels at block 442 may be optional because any suitable technique may be used by a computerized device to obtain channel information. Scanning may occur prior to the time that process 400 is performed. As an example, a device may periodically scan for channels and store the results of that scanning such that channel information may be available without repeating a scanning process at block 442. Also, in some embodiments, a device may obtain information about accessible channels other than as a result of scanning, such as through user input.

Regardless of the manner in which channel information is obtained, processing may proceed to block 444 where the device operating as a client marks channels supported in the master lineup. Processing at block 444 may be performed in any suitable way. However, in a device configured as in FIG. 2, the master lineup may be marked by sending one or more messages to a device configured as a master.

Following execution of block 444, process 400 may end with the device performing that process configured as a client in a group. With that group formed, a user of any device within the group may provide input to initiate a television operation. Such input may be a request to initiate display of live television or may be a request to record television programming. In a device configured according to FIG. 2, such input may be received through user interface 210. Though, the specific mechanism by which user input is received is not critical to the invention.

In some embodiments, a request for a television operation may be generally in a form as is known in the art for systems that display or record television programming. In response to such a request, a system 10 may make available television programming. Though, rather than directly configuring a local tuner to respond to such user input, the client control component 230 may send messages representing the user input to a master control component 220 in a device configured to act as a master. In scenarios in which the user input is received through a user interface in a client device, separate from the master device, such communications may pass over a network. In other embodiments, the user input may be received at a device configured to act as a master, and communication between the client control component 230 and master control component 220 may be entirely within a single device.

Regardless of the source of the request, the process of FIG. 5 may begin when a device, configured as a master of a group of devices, receives a request for live television at block 510. This request may initiate processing within master control component 220 that results in selection of an appropriate tuner to respond to the request.

The request received at block 510 may identify television programming in any suitable way. In the illustrated embodiment, the request may identify a source of content. In some embodiments, user options for selection of a source of content may be limited at the client device generating the request in block 510 to only sources of content identified in master lineup 330. Any suitable technique may be used to limit user requests to supported sources of content. For example, a request may be generated based on a user selection of an option through a graphical user interface that is rendered to present to the user only the option to view television programming from a content source accessible through a tuner in the group.

Though, in alternative embodiments, the process of FIG. 5 may be adapted to respond to requests for viewing programming from content sources even if those content sources cannot be accessed. In those embodiments, additional checks may be performed, either on a client device or the master device. In response to such checks, error messages may be generated to a user or other corrective actions may be initiated. Though, for simplicity of illustration, such checks and error messages are not expressly illustrated.

In response to a request, a tuner may be selected in sub-process 520. Once a tuner is selected in sub-process 520, a connection may be made between the device generating the request at block 510 and the device containing the selected tuner such that television programming obtained by the selected tuner may be obtained at the device requesting the live television programming. When the device requesting television programming is different than the device in which the selected tuner is resident, digital data representing the television programming may be passed over network 14 to the client control component 230 in the device requesting the television programming. In scenarios in which the selected tuner is within the device generating the request received at block 510, the client control component 230 in the requesting device may, instead of establishing a connection with a remote device, obtain the television programming information from a tuner control component 232 within the same device. Regardless of how the digital data representing television programming is obtained, once obtained, the digital data may be rendered to a user, such as through user interface 234.

Appropriate selection of a tuner may be performed by sub-process 520, which may be executed within master control component 220 of a device configured to operate as master of a group containing the device that generated the request at block 510. Sub-process 520 may consider multiple factors in selecting a suitable tuner or tuners such that, in the aggregate, tuner selection is done in a way that enhances the experiences of users of the devices in the group. In sub-process 520, factors such as bandwidth, capability and availability are considered in making a tuner selection.

Sub-process 520, in the illustrated example, begins at block 522 where devices in the group are ordered by bandwidth. In this scenario, bandwidth indicates bandwidth of a connection between a device containing a tuner at which television programming may be initially captured and a device at which the television programming may be rendered to a user. In the exemplary system of FIG. 1, each of the devices is connected through network 14, which may equally allocate bandwidth to all of the computerized devices. However, the computerized devices may be connected to network 14 through different access mechanisms, such as access mechanism used by a device may impact its bandwidth. Accordingly, in sorting devices at block 522, the nature of access between a computerized device and network 14 may be taken as an indicator of bandwidth. Devices, such as computer 24 or computer 22 that are hardwired to network 14 maybe regarded as having a higher bandwidth than a device, such as computer 26 that is connected to network 14 through a wireless access point 28.

Information about a network connection may be obtained by the master device and stored within tuner pool 320 as clients register with the master device such as during processing at bloc 444 (FIG. 4). Each client device may obtain information revealing the nature of its connection to network 14 through a network interface 224 using techniques as are known in the art or in any other suitable way. Regardless of the specific mechanism used, a master device will have available information about other devices in the group such that the devices may be ordered at block 522.

Though, in a scenario in which devices are being ordered by bandwidth for the purposes of presenting live television programming, an exception to the general pattern of ordering devices based on the nature of their connection to network 14 may be made. The device from which the request for live television programming is generated will not need to obtain digital data over network 14 representing television programming if a local tuner in the requesting device is being used to access the television programming. In that scenario, the requesting device will have the highest possible bandwidth connection to the device containing the tuner. Accordingly, when ordering devices at block 522 for live television, the requesting device may be assigned the highest order and other devices may be ordered based on the nature of the connection between the device and network 14.

At block 524, for devices containing multiple tuners, the tuners may be ordered based on capability. Any suitable metrics may used for indicating tuner capability. In some scenarios, certain channels are designated by a television service provider as being "premium" channels. Obtaining television programming over a premium channel may require that a tuner be equipped with a key or other special configuration information, such that only a limited number of tuners may have access to those channels. Tuners equipped to access television programming on premium channels may be regarded as having higher capabilities than similar tuners that cannot access premium channels. Likewise, some tuners may be adapted to obtain television programming that has been encrypted for digital rights management. Those tuners, for example, may be adapted through hardware or software to decode television programming that has been encrypted for digital rights management. Accordingly, a tuner that can obtain television programming subject to digital rights management may be regarded as having higher capability than a tuner without comparable abilities. Other metrics may likewise be used to order tuners by capability. For example, the number of channels that may be accessed through a tuner is another example of a metric by which devices may be ordered by capability.

Though, any suitable criteria or criteria may be used to order tuners by capability. Moreover, any suitable order of precedence for the criteria may be used. The order of precedence may be fixed or determined dynamically. When determined dynamically, the precedence may be based on a percentage of tuners meeting each criteria. As just one example, when a group contains a higher percentage of tuners that can access premium channels than can support digital rights management functions, the ability to support digital rights management may be given precedence.

Regardless of the specific criteria and order of precedence of criteria used for ordering devices and tuners, the tuners within each device may be ordered such that devices with the highest bandwidth and tuners with the least capability are considered first. To this end, sub-process 520 proceeds to loop start 530, where the tuners are considered according to the established order.

Loop start 530 represents the beginning of a loop in which devices within an identified group are considered in turn according to the order established at block 522. The loop that begins at loop start 530 contains an inner loop that begins at loop start 532. In the loop beginning at loop start 532, tuners within the device identified for consideration at loop start 530 are considered in turn, in accordance with the order established at block 524 for the identified device.

Within these loops, processing proceeds to decision block 534. At decision block 534, the process branches depending on whether the tuner identified at block 532 is in use. If so, the process branches to decision block 550. A master device may determine that a tuner is in use by sending a status request to the device containing that tuner, receiving periodic status reports relating to the tuners, consulting a log of commands sent to control, or using any other suitable technique.

At decision block 550, the process again branches depending on whether there are more tuners in the identified device to be considered. If so, the process branches back to loop start 532 where the next tuner for the identified device is then identified for consideration. Conversely, if there are no further tuners for the identified device, the process branches from decision block 550 to decision block 552.

At decision block 552, the process again branches, depending on whether there are additional devices in the group that have not been considered. If additional devices remain for consideration, the process branches from decision block 552 back to the start of the outer loop at loop start 530. At loop start 530, the next device in the order as established at block 522 is considered.

As each subsequent tuner for each subsequent device is identified at loop start 532, the process again continues to decision block 534. At decision block 534, if the tuner being considered is not in use, the process proceeds to decision block 540. At decision block 540, the process may again branch, based on whether the identified tuner has the capability to obtain television programming over a premium channel.

If not, the process branches to block 544 where the tuner being considered is selected for use in acquiring television programming according to the request received at block 510. The device requesting live television programming at block 510 may be informed of the selection, and the tuner may be commanded, through messages sent to the device containing the tuner, to tune to the channel from which the requested television programming can be obtained. Digital data representing the obtained television programming may then be communicated to the requesting device in any suitable way, where it may be presented to a user. Accordingly, sub-process 520 may end following block 544 with the request received at block 510 being satisfied.

Though, if an identified tuner being considered is a premium tuner, sub-process 520 may branch from decision block 540 to decision block 542. At decision block 542, the process may again branch, depending on whether non-premium tuners are available on any other device in the group to satisfy the request received at block 510. If so, the identified premium tuner is not selected. Rather, the process proceeds to decision block 550 where, as described above, additional tuners are considered. Though, if there are no other available tuners that are not premium tuners, the process proceeds from decision block 542 to block 544 where the tuner is selected, even though a premium tuner.

Sub-process 520 may continue in this fashion, considering additional tuners and additional devices until a tuner is selected at block 544 or until no further tuners or devices are available. When no further tuners or devices remain to be considered, the process will branch from decision block 552 to block 556. If sub-process 520 reaches 556, it has been determined that there is not an available tuner to satisfy the request for live television programming received at block 510. Master control component 220 may be adapted to respond to this condition in any suitable way.

In the embodiment illustrated, master control component 220 may respond by informing the user that input the request received at block 510 that no tuner is available. In some embodiments, the message indicating that no tuner is available may additionally indicate to the user one or more tuners within the group that is capable of satisfying the request, but is in use. In that scenario, the user may be allowed to provide input, instructing master control component 220 to change the allocation of a tuner in use to satisfy the request received at block 510.

Such interactions between the master control component 220 choosing a tuner and the user initiating a request may be performed or limited in any suitable way. In the embodiment illustrated, the master control component 220 may interact with a client control component 230 in the device associated with the user issuing the request. Client control component 230 may render a user interface based on commands received from the master control component. The client control component 230 may then forward user input to the master control component 220. When the user is interacting with the system through a device other than the device configured as the master for the group, such interactions between the master control component and the client control component may be communicated over network 14 or in any other suitable way. Though, such processing to change the use of a tuner may be limited based on identities or priorities associated with users of the system. As an example, a user may only enter input at block 556 reallocating a tuner that was allocated based on a previous request of that user. Where priorities are associated with users or programming requests, the request may be processed only if the tuner reallocated is associated with a prior lower priority request.

Figure 6:
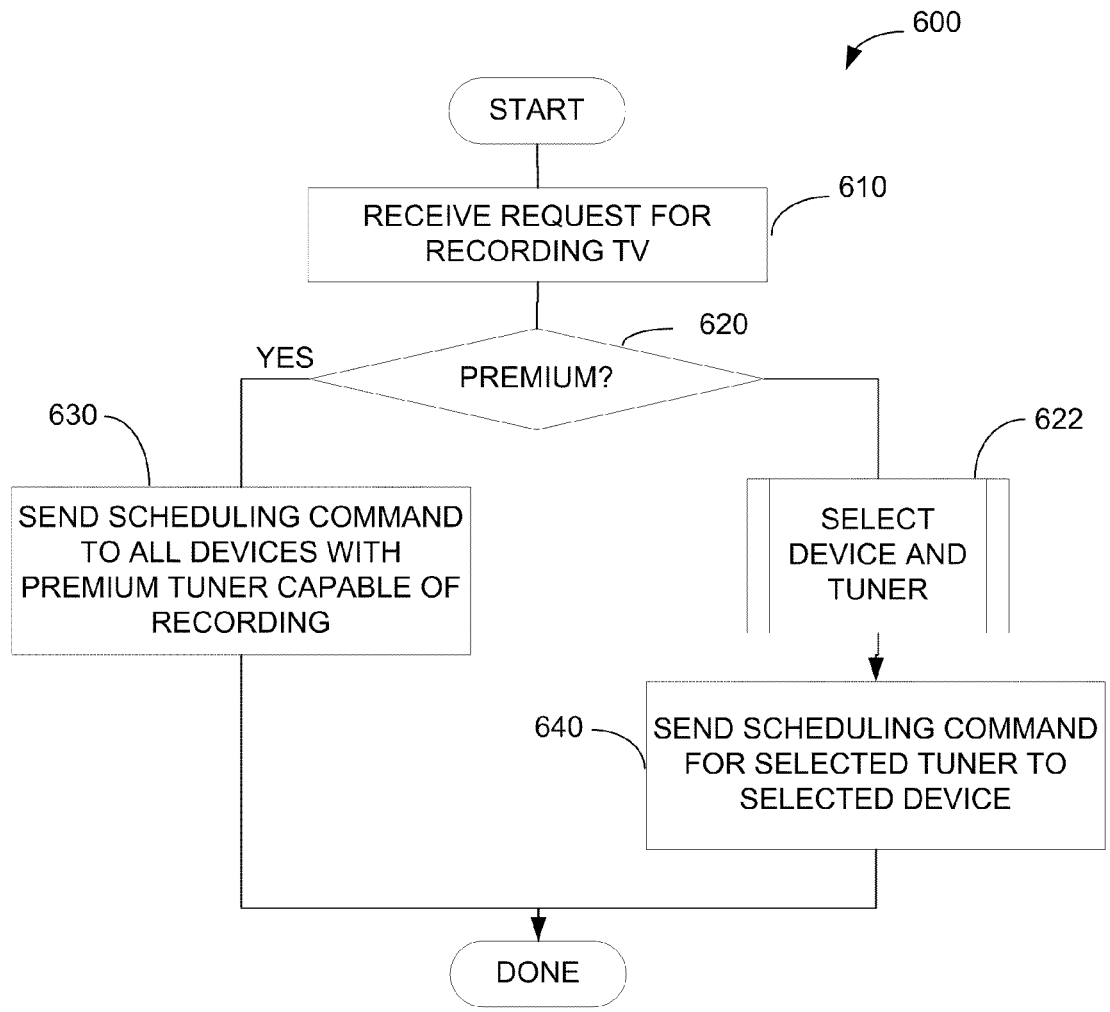
FIG. 6 is a flow chart of a process for recording a program that may be performed by a device operating as a master in the environment of FIG. 1.

A similar process of selection may be performed for request for television recording. FIG. 6 illustrates a process 600 that may be performed by a master control component 220 in a device configured to act as a master for a group. The process 600 may begin at block 610 where a request for recording television programming may be received. As with the request for live television programming received at block 510 (FIG. 5), the request for recording television programming received at block 610 may be received from a client control component 230 in any device within the group, including from the device configured to operate as the master.

Also as with the request received at block 510 (FIG. 5) the request received at block 610 may identify television programming in any suitable way. In some embodiments, a request for recording television programming may incorporate a recording time. The recording time may specify one or more times in the future at which the recording is to occur. In some embodiments, a client control component 230 may buffer the request for recording until the appropriate time, and then send the request to master control component 220 for selecting a tuner to fulfill the request. Though, in the embodiment illustrated in FIG. 2, requests for recording television programming are sent to master control component 220 in a device operating as a group master. The master control component 220 stores the request as part of master schedule 240 until a time at which the request is to be fulfilled by controlling a tuner to record the requested television programming. Accordingly, receiving a request for recording television programming at block 610 may be based on a request received directly in response to user input or retrieved from a recording schedule, such as master recording schedule 340, based on previously provided user in put.

Regardless of the manner in which the request is received, processing of the request may proceed to decision block 620. At decision block 620 the process may branch, depending on whether the television programming to be recorded per the request is to be obtained on a premium channel. If so, in the embodiment illustrated, the request may be satisfied by commanding all tuners that are available and capable of recording the requested television programming. Accordingly, process 600 may branch from decision block 620 to block 630 where a master control component 220 executing process 600 may send scheduling commands to all devices with available premium tuners that are capable of recording the requested programming. Thereafter, the process 600 may end, with the request being satisfied by the commanded premium tuners.

Conversely, if the requested television programming is available on a channel other than a premium channel, the process may branch from decision block 620 to sub-process 622. At sub-process 622, a tuner may be selected for fulfilling the requested recording. Sub-process 622 may be in the same form as sub-process 520 in which a tuner is selected for recording live television programming. However, sub-process 622 may differ from sub-process 520 in that at block 522 the ordering of devices by bandwidth assigns the highest possible bandwidth to the device on which the obtained television programming will be displayed. In sub-process 622 in which a tuner is selected to record television programming for later display, the device on which the recorded programming will be displayed may not be known. Accordingly, in performing sub-process 622, devices may be considered in an order based on a type of connection to network 14 or other indicator of bandwidth without different treatment for the device from which the request received at block 610 was generated. A further difference in ordering for requests related to recording may be that tuners classified as removable may be given the lowest priority. Recording television programming in a removable device creates the possibility that the recorded content will not be available to the group when a user seeks to view it. Though, it should be appreciated that the foregoing are only examples of ordering criteria, and any suitable criteria may be used.

Once a tuner is selected at block 622, the process may proceed to block 640. At block 640, the selected tuner may be commanded to record television programming in accordance with the request received at block 610. In the embodiment illustrated, a command may be sent from the master control component 220 of the device configured to act as a group master to the client control component 230 in the device containing the selected tuner. In the embodiment illustrated, the command sent at block 640 may be sent at the time that recording is to begin. Though, other embodiments are possible. For example, the command may be sent at block 640 at any suitable time and stored within a local recording schedule 314 in the device containing the tuner.

Other variations the specific format of the command sent at block 640 are possible. For example, the commands sent at block 640 may designate a duration of recording or a stop time for the recording. Information specifying the duration of recording may be specified in units of time or may specified based on a number of television programs such that a device receiving the command may consult an electronic program guide to determine an appropriate interval over which recording is to occur. Therefore, it should be recognized, that the specific format of the command sent at block 640 is not critical to the invention.

Regardless of the format in which a command is sent at block 640, once a command is sent to control the recording, process 600 may end. Though, the process may be repeated for each request for recording television programming.

Figure 7:
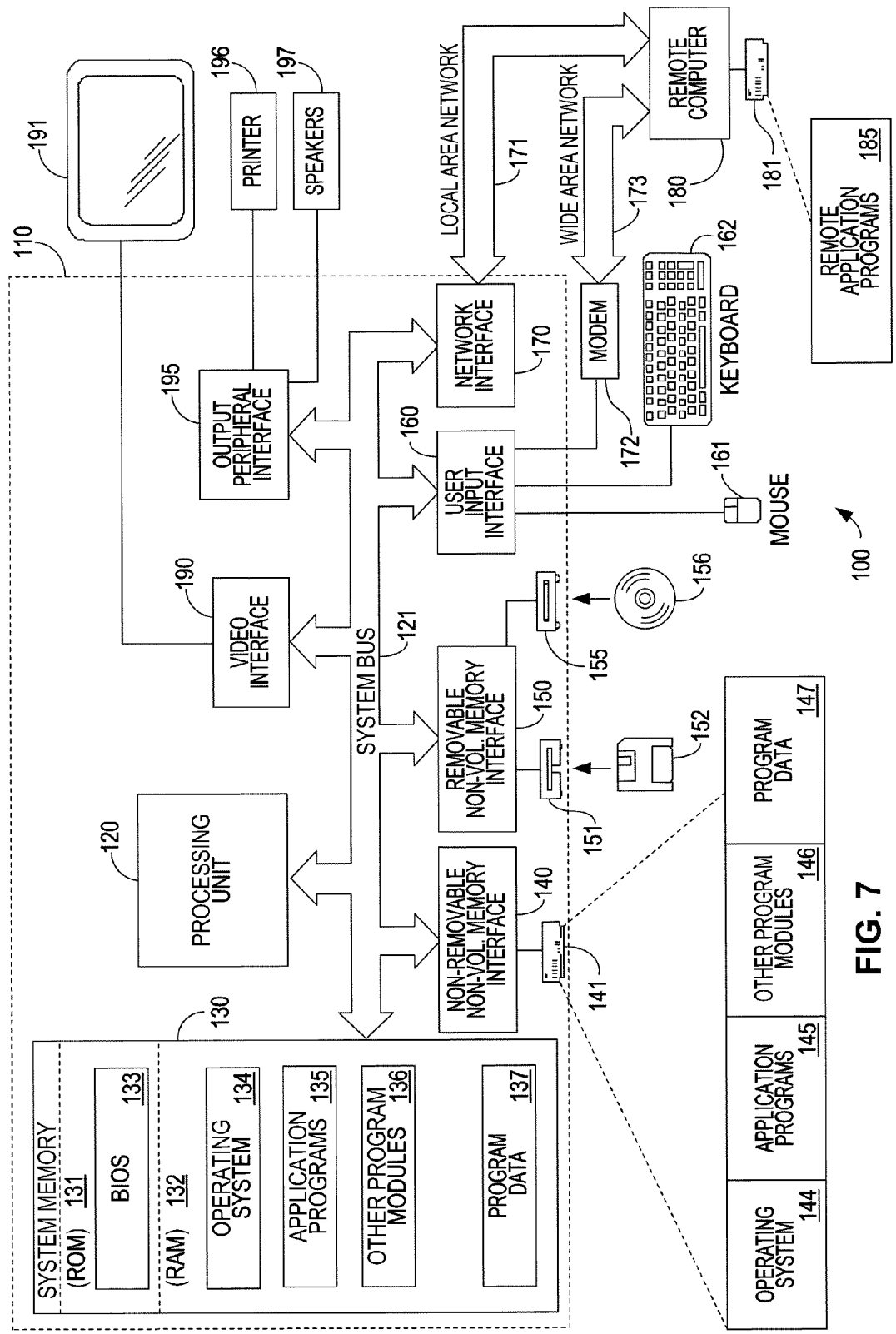
FIG. 7 is an architectural block diagram representative of computerized devices that may operate within the environment of FIG. 1.

FIG. 7 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

The computer 110 may also include other removable/non-removable, volatile/nonvolatile computer storage media. By way of example only, FIG. 7 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Through, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system comprising:
   a master device, the master device comprising:
   a network interface; and
   a master control component for interacting with clients in a group of clients, the master control component adapted to:
   receive from a first client, an identification of a first channel lineup available to the first client to provide to other clients in the group of clients for recording purposes;
   receive from a second client, an identification of a second channel lineup available to the second client to provide to other clients in the group of clients for recording purposes, wherein the second channel lineup available to the second client is different than the first channel lineup available to the first client and comprises at least one premium channel that is unavailable to the first client;
   generate in the master control component, an aggregated channel lineup indicative of an overall recording capability of the group of clients, the aggregated channel lineup comprising the first and the second channel lineups;
   create a master recording schedule reflecting an aggregate of recording requests received through the network interface, the aggregate of recording requests comprising at least one recording request from one of the other clients in the group of clients;
   select on the basis of the at least one recording request, an appropriate one of the first or the second channel lineups to record a scheduled program;
   and issue a command through the network interface to the one of the first or the second client providing the appropriate one of the first or the second channel lineups, to record the scheduled program on the first client if the channel for the scheduled program is not on the at least one premium channel, and to record the scheduled program on the second client if the scheduled program is on a premium channel;
   and select a tuner from among one or more tuners to record the scheduled program based at least in part on network bandwidth available to each of the one or more tuners.

2. The system of claim 1, wherein each of the first and the second clients include a client control component for configuring the first and the second clients to operate as clients, the client component being adapted to communicate information about one or more tuners in the first and the second clients through the network interface to the master device.

3. The system of claim 2, wherein the client control component is further adapted to communicate additional information to the master device, the additional information comprising capabilities of each of the first and the second clients to provide a live display capability to one or more clients in the group of clients.

4. The system of claim 2, wherein information about the one or more tuners comprises a first capability of a tuner in the first client and a second capability of a tuner in the second client, wherein the second capability is different than the first capability.

5. The system of claim 4, wherein:
   the aggregated channel lineup further comprises identification of one or more sources of programming and channels on which the one or more sources of programming can be accessed; and
   the master control component is further adapted to store in conjunction with the aggregated channel lineup, an identity of one or more tuners that are provided within the group of clients for accessing one or more channels in the aggregated channel lineup.

6. The system of claim 5, wherein:
   the master control component is further adapted to select a tuner from among the one or more tuners to record the scheduled program based at least in part on information in the aggregated channel lineup.

7. The system of claim 6, wherein the network interface comprises an interface to a home computer network.

8. The system of claim 7, wherein the first client is one of a laptop computer or a desktop computer, and the second client is a digital video recorder.

9. The system of claim 1, wherein the master device is a designated one of the group of clients.

10. A method comprising:
    in a master device:
    creating tuner information identifying a pool of tuners in a group of clients coupled to a network, the creating based at least in part on receiving information from each of the clients in the group, the information comprising a first channel lineup available to a first client to provide to other clients in the group of clients for recording purposes, and a second channel lineup available to the second client to provide to other clients in the group of clients for recording purposes, wherein the second channel lineup available to the second client is different than the first channel lineup available to the first client and comprises at least one premium channel that is unavailable to the first client;

using the tuner information to create a master lineup indicating an aggregate recording capability of the group of clients, the master lineup comprising the first and the second channel lineups;

maintaining a master recording schedule based on recording requests received from one or more clients in the group of clients, the master recording schedule comprising at least one recording request from one of the other clients in the group of clients;

selecting on the basis of the at least one recording request, an appropriate one of the first or the second channel lineups for recording a scheduled program;

sending a recording command to one of the first or the second client that is providing the appropriate one of the first or the second channel lineups, to record the scheduled program on the first client if the channel for the scheduled program is not on the at least one premium channel, and to record the scheduled program on the second client if the scheduled program is on a premium channel; and selecting a tuner from among one or more tuners to record the scheduled program based at least in part on network bandwidth available to each of the one or more tuners.

11. The method of claim 10, wherein:

when a program in the master recording schedule is available on a premium channel, sending the recording command to all available tuners in the pool of tuners capable of recording the premium channel.

12. At least one non-transitory computer storage medium comprising computer-executable instructions that, when executed on a computerized device, perform a method comprising:

receiving in a master device of a group of devices configured to share television information, a first recording capability of a first client device and a second recording capability of a second client device belonging to the group of devices, wherein the first recording capability is different than the second recording capability by comprising at least one premium channel that is unavailable to the first client device;

generating an aggregated channel lineup indicative of an overall recording capability of the group of client devices, the generating based at least in part on receiving the first recording capability and the second recording capability;

receiving in the master device, a request from a third client device to schedule a program for recording;

selecting on the basis of the request from the third client device, an appropriate one of the first recording capability or the second recording capability to record the scheduled program on the first client device if the channel for the scheduled program is not on the at least one premium channel, and to record the scheduled program on the second client device if the scheduled program is on a premium channel;

selecting a tuner from among one or more tuners to record the scheduled program based at least in part on network bandwidth available to each of the one or more tuners;

and transmitting from the master device, instructions to record a program using a tuner within one of the first client device or the second client device that has the appropriate one of the first recording capability or the second recording capability.

13. The at least one non-transitory computer storage medium of claim 12, wherein the method further comprises:

receiving from at least one of the first or the second client device, information identifying one or more tuners located in the at least one of the first or the second client device.

14. The at least one non-transitory computer storage medium of claim 13, wherein the method further comprises:

receiving from at least one of the first or the second client device, recording information identifying one or more programs to record; and maintaining a master recording schedule based on the received recording information.

15. The at least one non-transitory computer storage medium of claim 14, wherein the method further comprises:

for each of a plurality of programs in the master recording schedule:

selecting a tuner from the identified one or more tuners to record the program.

16. The at least one non-transitory computer storage medium of claim 15, wherein selecting a tuner from the identified one or more tuners to record the program comprises:

selecting based on a bandwidth of a network connection.

* * * * *